(12) United States Patent
Liu et al.

(10) Patent No.: US 7,702,246 B2
(45) Date of Patent: Apr. 20, 2010

(54) OPTICAL LABEL SWITCHING SCHEME EMPLOYING DIFFERENTIAL PHASE-SHIFT KEYING FOR PAYLOADS AND INTENSITY MODULATION FOR LABELS USING A SINGLE OPTICAL MODULATOR

(75) Inventors: Xiang Liu, Marlboro, NJ (US); Yannick Keith Lize, Montreal (CA); Xing Wei, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 316 days.

(21) Appl. No.: 11/161,711

(22) Filed: Aug. 13, 2005

(65) Prior Publication Data
US 2007/0036556 A1    Feb. 15, 2007

(51) Int. Cl.
*H04B 10/00* (2006.01)
(52) U.S. Cl. .................. 398/198; 398/183; 398/192; 359/238
(58) Field of Classification Search .......... 398/182–201
See application file for complete search history.

(56) References Cited

U.S. PATENT DOCUMENTS

| | | | | |
|---|---|---|---|---|
| 5,003,624 A | * | 3/1991 | Terbrack et al. | 398/198 |
| 5,343,324 A | * | 8/1994 | Le et al. | 398/198 |
| 5,495,359 A | * | 2/1996 | Gertel et al. | 359/245 |
| 5,880,870 A | * | 3/1999 | Sieben et al. | 398/183 |
| 6,046,838 A | * | 4/2000 | Kou et al. | 359/245 |
| 6,204,954 B1 | * | 3/2001 | Nagarajan | 359/279 |
| 6,370,290 B1 | * | 4/2002 | Ball et al. | 385/14 |
| 6,392,779 B1 | * | 5/2002 | Iannelli et al. | 359/245 |
| 6,473,219 B1 | * | 10/2002 | King | 359/245 |
| 6,671,079 B2 | * | 12/2003 | Fuller et al. | 359/264 |
| 6,687,451 B1 | * | 2/2004 | Sikora | 398/187 |
| 6,694,098 B1 | * | 2/2004 | Warbrick et al. | 398/54 |
| 6,766,070 B2 | * | 7/2004 | Williams et al. | 385/3 |
| 6,925,257 B2 | * | 8/2005 | Yoo | 398/47 |
| 6,940,863 B2 | * | 9/2005 | Xue et al. | 370/401 |
| 7,024,112 B2 | * | 4/2006 | Way | 398/51 |
| 7,039,316 B2 | * | 5/2006 | Chang et al. | 398/51 |
| 7,106,486 B1 | * | 9/2006 | Nahapetian et al. | 359/238 |
| 7,200,343 B2 | * | 4/2007 | Ikeuchi | 398/198 |
| 7,277,645 B2 | * | 10/2007 | Gill et al. | 398/185 |
| 2002/0003648 A1 | * | 1/2002 | Kobayashi et al. | 359/180 |
| 2006/0051092 A1 | * | 3/2006 | Way | 398/79 |

OTHER PUBLICATIONS

Blumenthal et al, "All Optical Label Swapping Networks and Technologies", J.Lightwave Technologies,vol. 18, pp. 2058-2075,2000.
Koonen et al,"Optical Packet Routing In IP-Over-WDM Networks Deploying Two-Level Optical Labeling",ECOC 2001, pp. 14-15, 2001.

(Continued)

*Primary Examiner*—Agustin Bello
(74) *Attorney, Agent, or Firm*—Brosemer, Kolefas & Associates

(57) ABSTRACT

An optical label-switching method and apparatus in which a payload signal is modulated on an optical carrier through differential phase-shift keying (DPSK) by a Mach-Zehnder modulator (MZM), and a label signal is imposed on the DPSK signal by the same MZM through an optical amplitude change effected by modulating the DPSK drive signal or MZM bias.

16 Claims, 8 Drawing Sheets

OTHER PUBLICATIONS

Chi et al,"Dispersion Management for Two-Level Optically Labeled Signals in IP-Over-WDM Networks", ECOC 2002, Paper 5.5.1, 2002.

Koonen et al, "Optical Labeling of Packets in IP-over-WDM Networks", ECOC 2002, Paper 5.5.2, 2002.

Chi et al, "Transmission and Transparent Wavelength Conversion of an Optical Labeled Signal Using ASK/DPSK Orthogonal . . . ",IEEE Photon.Tech.Lett., vol. 15,pp. 760-762,May 2003.

Chang et al, "Multirate Payload Switching Using a Swappable Optical Carrier Suppressed Label In a Packet-Switched DWDM . . . ",J.Lightwave Tech., vol. 23, pp. 196-202,Jan. 2005.

Hickey et al, "Combined Frequency and Amplitude Modulation for the Starnet WDM Computer Communication Network",IEEE Photon.Technol.Lett.,vol. 6, pp. 1473-1475,Dec. 1994.

Chow et al,"Optical Packet Labeling Based on Simultaneous Polarization Shift Keying and Amplitude Shift Keying",Optics Lett., vol. 29,pp. 1861-1963, Aug. 2004.

Liu et al,"Optical-Label Switching Based on DPSK/ASK Modulation Format with Balanced Detection For DPSK Payload",ECOC 2003, Paper Tu4.4.3, 2003.

Liu'et al, "Transmission o fan ASK-Labeled RZ-DPSK Signal and Label Erasure Using a Saturated SOA",IEEE Photon.Tech.Lett., vol. 16,pp. 1594-1596, Jun. 2004.

\* cited by examiner

US 7,702,246 B2

OPTICAL LABEL SWITCHING SCHEME EMPLOYING DIFFERENTIAL PHASE-SHIFT KEYING FOR PAYLOADS AND INTENSITY MODULATION FOR LABELS USING A SINGLE OPTICAL MODULATOR

FIELD OF THE INVENTION

This invention relates generally to the field of optical packet switching. More particularly, it pertains to an optical label switching (OLS) scheme employing differential phase shift keying (DPSK) for payloads and intensity modulation for labels using a single optical modulator.

BACKGROUND OF THE INVENTION

Optical packet switching (OPS) and optical burst switching (OBS) are considered as next-generation transport technologies that will enable more efficient and flexible utilization of optical network capacity by providing sub-wavelength granularity. Optical label switching is a promising packet switching scheme that offers a number of features that are important to future data-intensive networks such as protocol and format independent transparency at the all optical data plane, simplification in the control plane and interoperability with legacy and emerging networking technologies including Generalized Multiprotocol Label Switching (GMPLS). Such a switching scheme was discussed by D. J. Blumental et al in a publication entitled "All-Optical Label Swapping Networks and Technologies", which appeared in the Journal of Lightwave Technologies, Vol. 18, pp. 2058-2075 in 2000, the entire contents of which are incorporated herein by reference.

One optically labeled packet transmission based on an orthogonal intensity modulation/differential phase shift keying (IM/DPSK) modulation format—in which payloads are intensity modulated while labels are carried by DPSK—has been proposed and demonstrated. (See., e.g., T. Koonen, et al, "*Optical Packet Routing In IP-Over-WDM Networks Deploying Two-Level Optical Labeling*", Proc. Eur. Conf. Optical Communications (ECOC 2001), pp. 14-15, 2001; N. Chi, et al, "*Dispersion Management for Two-Level Optically Labeled Signals in IP-Over-WDM Networks*", Proc. Eur. Conf. Optical Communications (ECOC 2002), Paper 5.5.1, Copenhagen, Denmark, 2002; T. Koonen et al, "*Optical Labeling Of Packets in IP-over-WDM Networks*" Proc. Eur. Conf. Optical Communications (ECOC 2002), Paper 5.5.2, Copenhagen, Denmark, 2002; and N. Chi et al, "*Transmission and Transparent Wavelength Conversion of an Optical Labeled Signal Using ASK/DPSK Orthogonal Modulation*", IEEE Photon. Tech. Lett., vol 15, pp. 760-762, May 2003).

Unfortunately, a number of significant drawbacks characterize these schemes. For example, since DPSK is carrying low-speed label information, a delay interferometer—which is needed in DPSK demodulation—produces a long delay difference between the two arms of the delay interferometer thereby resulting in significant temperature and polarization sensitivities. In addition, any change in the data rate of the label requires a change to the delay of the interferometer (to obtain a matched delay).

A further characteristic of such prior art schemes is that the removal and insertion of a label is not easily performed since the label is phase modulated. More specifically, to remove a label, cross gain modulation is used which changes the signal wavelength and therefore is undesirable in situations where signal wavelength needs to be maintained. To add a label, expensive phase sensitive modulation is required. Finally, low speed DPSK requires a high-coherence (narrow linewidth) source (CW) laser and is less tolerant to nonlinear effects such as cross-phase-modulation (XPM).

Other schemes utilizing frequency shift keying (IM/FSK) (See, e.g., G. K. Chang et. al., "*Multirate Payload Switching Using a Swappable Optical Carrier Suppressed Label In a Packet-Switched DWDM Optical Network*", J. Lightwave Technol., vol 23, pp. 196-202, January 2005), subcarrier modulation (IM/SCM) (See, e.g., M. Hickey et. al. "*Combined Frequency and Amplitude Modulation for the STAR-NET WDM Computer Communication Network*", IEEE Photon. Technol. Lett., Vol. 6, pp. 1473-1475, December 1994), or polarization shift keying (PoISK/IM) (See, e.g., C. W. Chow, et. al., "*Optical Packet Labeling Based on Simultaneous Polarization Shift Keying and Amplitude Shift Keying*", Optics Letters, Vol. 29, pp. 1861-1963, August 2004) have also been demonstrated.

More recently, it has been shown that using DPSK/IM for payload/label modulation and using a balanced receiver for DPSK detection provides superior receiver sensitivity of around −36 dBm for both the label and payload at a bit error rate (BER) of $10^{-9}$. (See, e.g., X. Liu, et. al., *Optical-Label Switching Based on DPSK/ASK Modulation Format With Balanced Detection For DPSK Payload*", Proc. Eur. Conf. Optical Communications (ECOC 2003), Paper Tu4.4.3, Rimini, Italy, 2003; and X. Liu, et. al., "*Transmission of an ASK-Labeled RZ-DPSK Signal and Label Erasure Using a Saturated SOA*", IEEE Photon. Technol. Lett., Vol 16, pp. 1594-1596, June 2004).

In a majority of these optical label encoding schemes, two optical modulators are required, one for encoding the payload and the other for the label. Consequently, such schemes are not particularly cost-effective and not easy to work with since the polarization state of the signal needs to be constantly maintained and its alignment when entering the two optical modulators is critical.

SUMMARY OF THE INVENTION

In recognition of the deficiencies in the prior art, we have developed a scheme for encoding both label and payload using a single modulator that is both simple and cost-effective while exhibiting superior receiver sensitivity making it particularly well-suited to applications involving polarization independent label swapping and packet wavelength conversion.

According to an aspect of our invention, a payload signal is modulated on an optical carrier through differential phase-shift keying (DPSK) by a Mach-Zehnder modulator (MZM) biased at null, and a label signal is imposed on the DPSK signal by the same MZM through an optical amplitude change effected by modulating the DPSK drive signal or MZM bias.

DESCRIPTION OF THE DRAWING

A more complete understanding of the present invention may be obtained from consideration of the following detailed description of the invention in conjunction with the drawing in which.

DETAILED DESCRIPTION OF THE INVENTION

By way of some further background, it is generally known that a phase-encoded signal may be generated using a MZM biased at a null point and driven by a $2V\pi$ voltage. One particularly advantageous feature of such signal generation is that even when the MZM is not fully driven or perfectly biased, exact phase encoding can still be achieved. Through our inventive method, we exploit this feature to modulate the amplitude of the DPSK payload for label encoding by modulation of the MZM bias or drive voltage, while maintaining a precise phase modulation of the payload.

Figure 1:
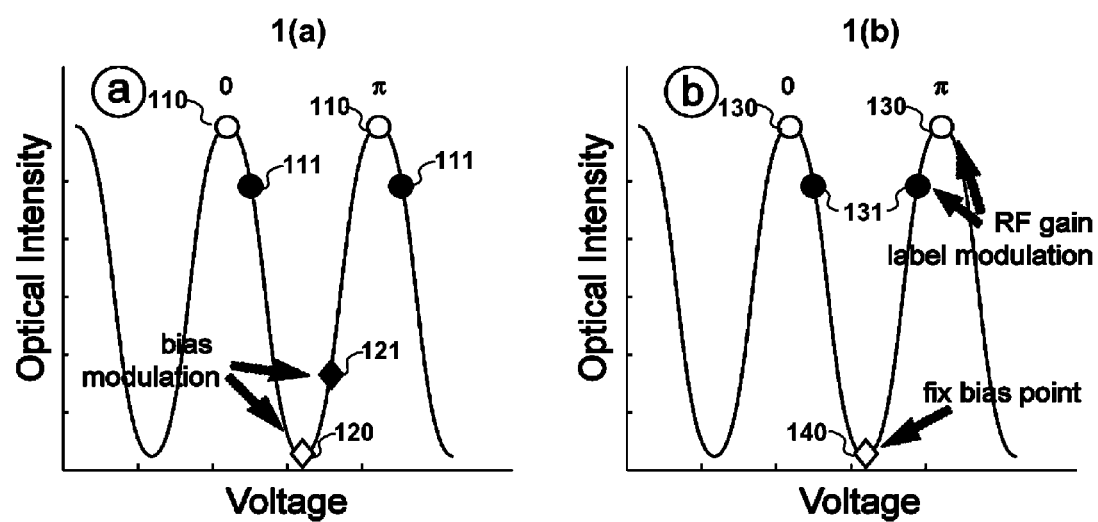
FIG. 1a is a transmission curve for label encoding through bias modulation.
FIG. 1b is a transmission curve for label encoding through drive-voltage modulation.

In a first exemplary embodiment of our invention directed to a single MZM label/payload encoding scheme, an RF port of the MZM is used to encode a 10 Gb/s DPSK payload while the label is encoded by modulating the bias port between the null port and a small fraction of $V\pi$ to impose an intensity modulation. With reference to FIG. 1a, there is shown a transmission curve of the bias-modulation scheme. More particularly, by shifting the bias, the phase modulation remains intact while a desired intensity is imposed. As shown in this FIG. 1a, the empty circles 110 illustrate payload modulation when the label bit is a "1". The filled circles 111 illustrate the payload modulation when the label bit is a "0". Finally, the diamonds 120, 121, mark the bias position(s), respectively.

Figure 2:
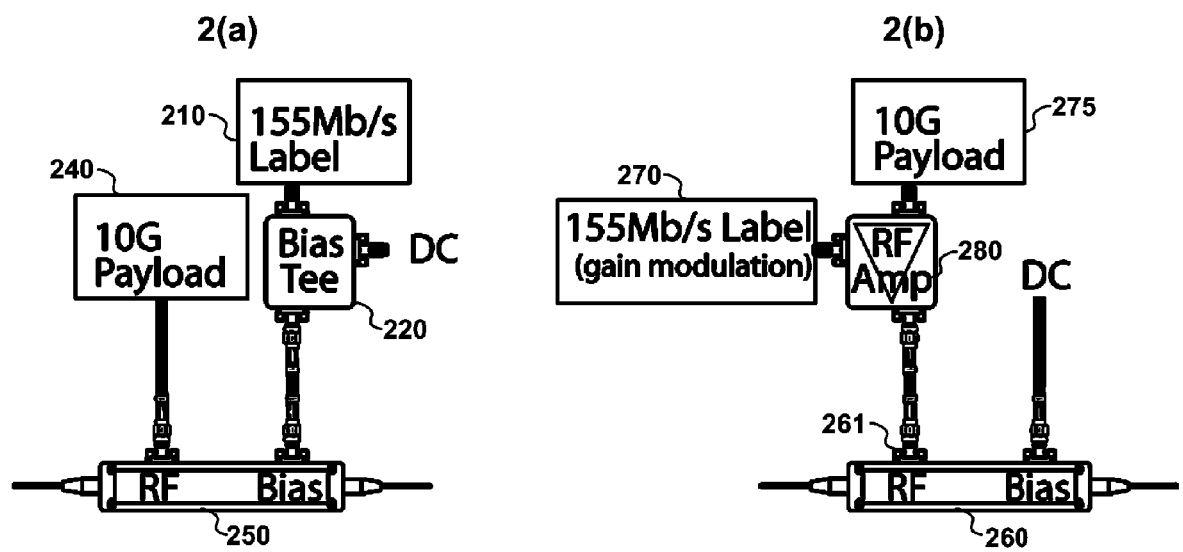
FIG. 2a is a schematic diagram of an apparatus for simultaneous DPSK-payload/OOK-label encoding through bias modulation.
FIG. 2b is a schematic diagram of an apparatus for simultaneous DPSK-payload/OOK-label encoding through drive-voltage modulation.

Turning now to FIG. 2a, there is shown a schematic of an implementation of the scheme of FIG. 1a. In particular, a 155 Mb/s label 210 is DC biased through the effect of a Bias Tee 220 and provided to MZM 250 along with 10 G payload 240 thereby producing simultaneous DPSK-payload/OOK-label encoding.

For a second exemplary embodiment of our invention, a transmission curve of a MZM wherein label encoding is performed through drive-voltage modulation is depicted in FIG. 1b. As before, the empty circles 130 illustrate payload modulation when the label bit is a "1". The filled circles 131 illustrate the payload modulation when the label bit is a "0". Finally, the diamond 140, marks the fixed bias position.

FIG. 2b illustrates an implementation of the scheme depicted in FIG. 1b. As can be seen in that FIG. 2b, the drive voltage at an RF port 261 of MZ modulator 260 is modulated to output a voltage of either $2V\pi$ and a fraction of $2V\pi$ through the modulation of the gain of the RF amplifier 280 by label signal 270. This imposes the desired intensity modulation for label encoding. By modulating the drive voltage and keeping bias constantly at null, the phase modulation is intact but a small intensity modulation occurs.

Figure 3:
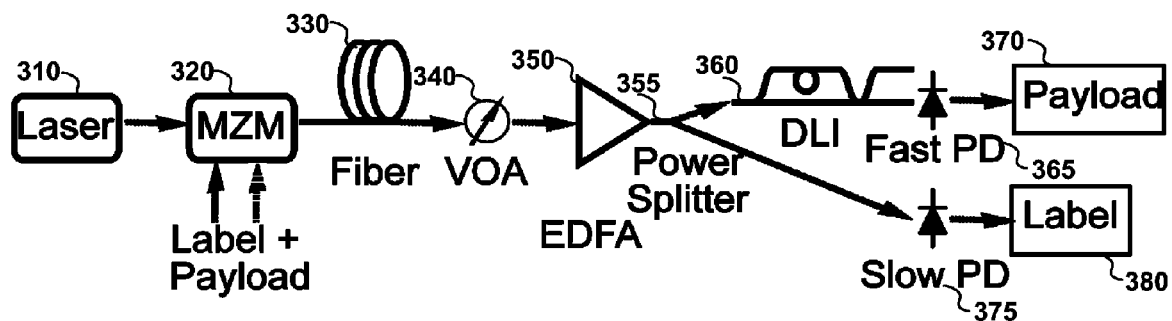
FIG. 3 is a schematic of an experimental setup for testing the two schemes depicted in FIGS. 2(a) and 2(b)

Turning our attention now to FIG. 3, there is shown a schematic of an apparatus used in verifying particular aspects of our inventive scheme(s). In particular, the apparatus 300 comprised a laser 310, MZM 320, optical fiber 330, Variable Optical Attenuator (VOA) 340, Erbium-doped Fiber Amplifier (EDFA) 350, Splitter 355, delay interferometer 360 and fast photodetector 365—both in the payload 370 detecting path, and slow photodetector 375 in label 380 detecting path.

For our schemes, direct detection of a label is achieved with an inexpensive, low-speed receiver while the DPSK payload is decoded using an optical 1-bit delay interferometer before detection by either a single or balanced detector. With the bias modulation scheme, we modulated the payload with a full $2V\pi$ and the bias with approximately $\frac{1}{3} V\pi$. In the RF gain modulation scheme, the output voltage was modulated between approximately $V\pi$ and $2V\pi$ while maintaining the bias constant at null.

Figure 4:
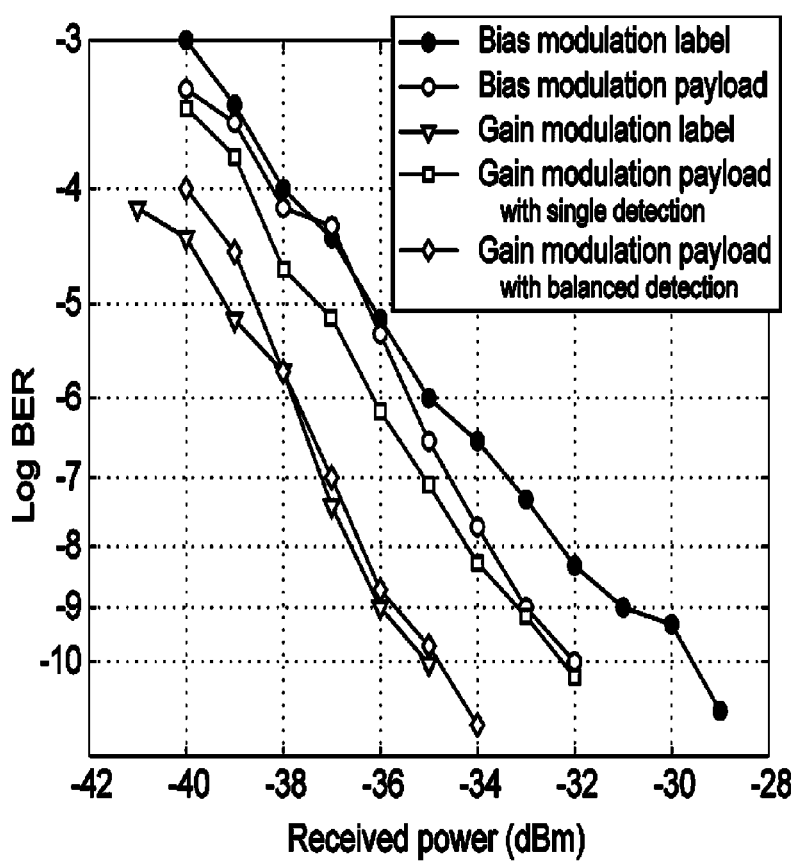
FIG. 4 is a graph depicting measured Bit Error Rate (BER) vs. Received Optical Power for our experimental schemes.

FIG. 4 is a graph showing the measured Bit Error Rate (BER) versus the received power (before the optical pre-amplifier) for the experimental setup used to evaluate our two schemes. As can be seen from that graph, in the MZM bias label modulation scheme, the measured receiver sensitivities are −33 dBm for the 155 Mb/s label and −31 dBm for the 10 Gb/s payload. In the drive-voltage label modulation scheme, the receiver sensitivities are 036 dBm for the 155 Mb/s label and −33 dBm for with the payload detector. As can be readily appreciated by those skilled in the art, these experimental results show excellent receiver sensitivity for the two schemes for both the payload and the label when compared to other formats.

We may conclude from our experiments that drive-voltage label modulation outperforms bias modulation by 2 dB. One explanation for such an observation may be that bias modulation exhibits some timing jitter and amplitude jitter due, in part, to the changing bias condition. This amplitude jitter appears on the signal as wings on the edges of the bits. Bias modulation effectively shifts in time the amplitude dips thereby creating a timing jitter on the payload which degrades the receiver sensitivity.

Figure 5:
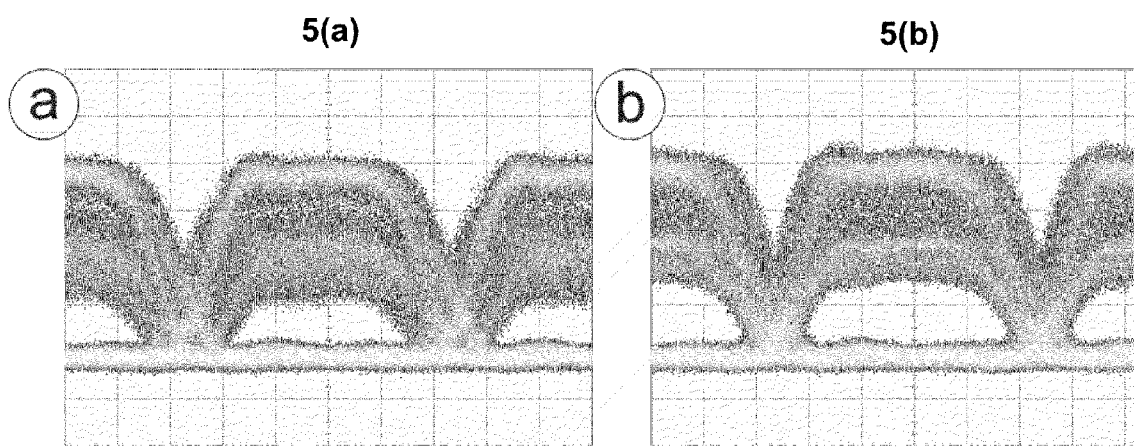
FIG. 5 is an eye diagram for a 10 Gb/s payload with a label encoded through 5(a) bias modulation and 5(b) drive-voltage modulation.

FIG. 5 shows eye diagrams of a 10 Gb/s payload having a label encoded through bias modulation 5(a) and drive-voltage modulation 5(b). In both, the payload is detected by a single detector. Clearly, and as can be seen from this FIG. 5, the eye opening for the situation having drive-voltage modulation (FIG. 5(b)) is more open than that with bias modulation (FIG. 5(a)).

Figure 6:
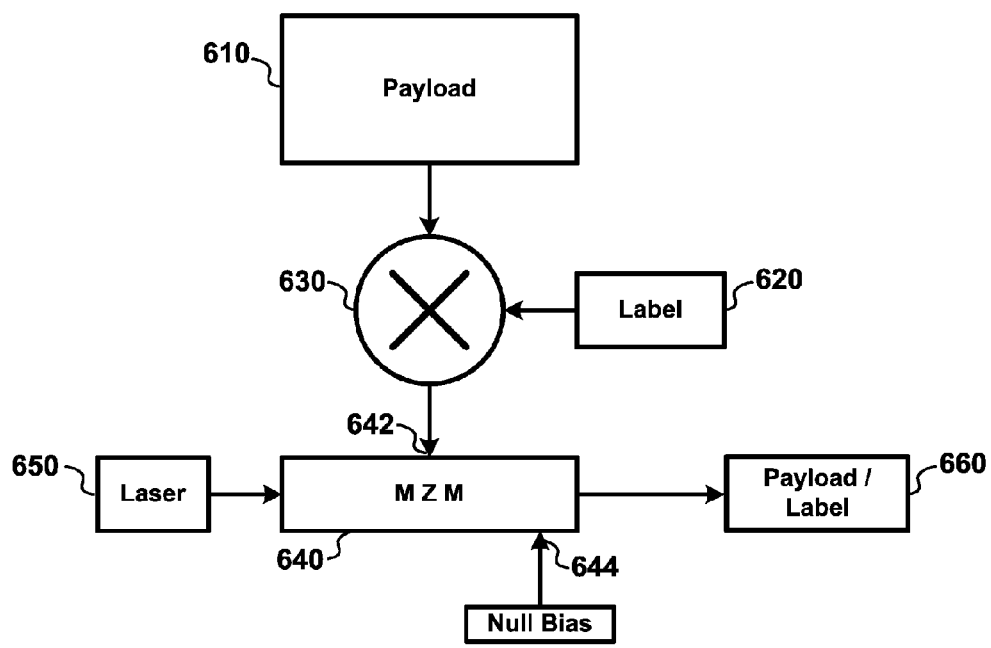
FIG. 6 is a schematic of an optical label switching transmitter constructed according to one embodiment of the present invention.

Turning now to FIG. 6, there is shown a schematic for our inventive Optical Label Switching scheme as employed in a transmitter wherein a payload 610 signal is modulated on an optical carrier through differential phase-shift keying by a Mach-Zehnder Modulator 640 biased at null 644, and a label 620 signal is imposed onto the DPSK signal through optical amplitude change effected by modulating the DPSK drive signal.

It is assumed that the data rate of the payload 610 data rate is much greater (e.g., more than 10 times greater) than the data rate of the label 620. The low-speed label signal may be modulated onto the payload signal by varying the drive voltage swing through gain modulation of an RF amplifier 630. As a third exemplary embodiment of our invention, a broadband RF modulator 630 may be used to modulate label signal 620 onto payload signal 610. As can be seen by examining this FIG. 6, a CW source (laser) 650 is modulated by the Mach-Zehnder Modulator 640 that is biased at null 644 wherein the payload/label data have been encoded and are subsequently output as combined payload/label signal 660.

Figure 7:
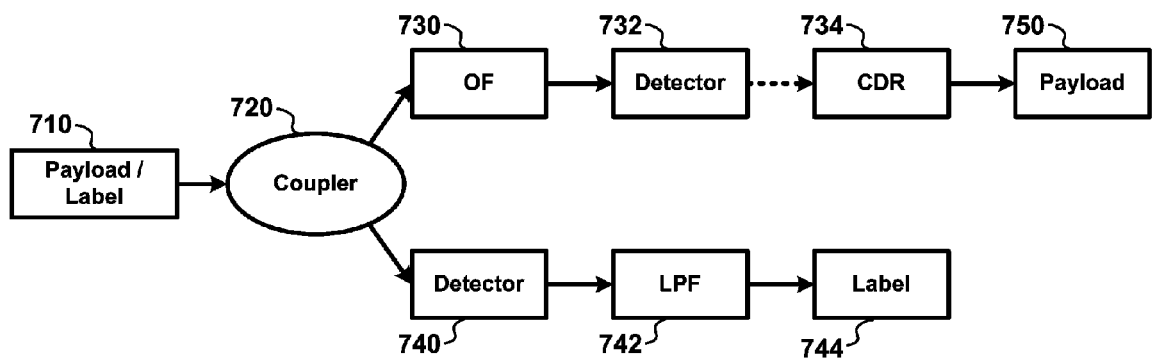
FIG. 7 is a schematic of an optical label switching receiver constructed according to the present invention.

FIG. 7 shows a schematic of a corresponding receiver for the transmitter of FIG. 6. Within the receiver 700, a DPSK payload/label signal 710 is split by coupler 720. The DPSK signal is preferably converted from DPSK to on-off-keying (OOK) by passing the DPSK signal through an optical filter 730, having substantially a 3 dB bandwidth which is about 70% of the payload data rate. This signal is detected at detector 732 and subsequently processed by conventional clock data recovery 734 circuitry, producing payload 750. Similarly, the label 744 may be extracted by low-speed detector 740 followed by suitable low-pass filter 742. While not explicitly shown in this FIG. 7 those skilled in the art will readily appreciate that an optical delay line interferometer or asymmetric Mach-Zehnder interferometer may be sued to convert the DPSK data to OOK before the clock data recovery process, 734.

Figure 8:
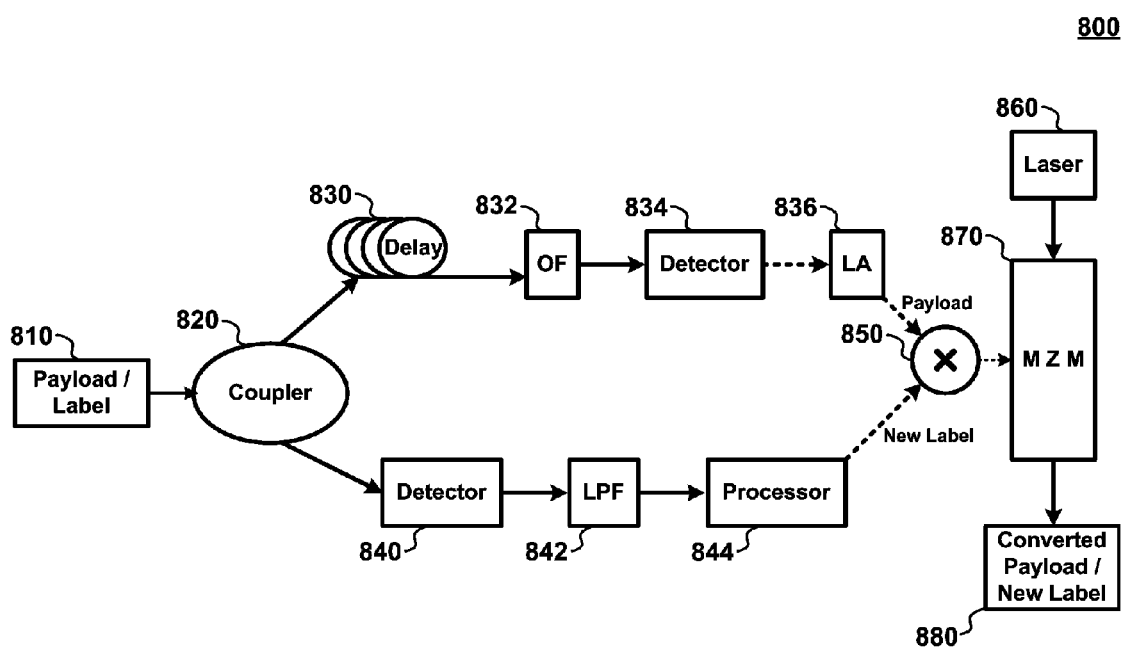
FIG. 8 is a schematic of an optical label swapping and packet wavelength conversion system—residing in a network intermediate (VIA) node—according to the present invention.

Turning now to FIG. 8, there is shown an intermediate (VIA) node device applicable to, for example, those situations where the label needs to be processed but the payload does not.

With reference to that FIG. 8, a signal including both payload and label(s) 810 is split by coupler 820 and the split signal(s) are directed through two separate paths. A first path, which will subsequently provide a payload for a converted signal, is directed through a length of fiber 830, providing a suitable delay to the signal. The delayed signal is then converted to OOK, through the effect of optical filter 832 and subsequently detected by detector 834. After detection, the signal is processed by an RF limiting amplifier 836 which removes amplitude fluctuations caused by label signal(s).

Simultaneous with this first path processing, the split signal is directed through a second path, which subsequently provides a new/converted label for the converted signal, where it is detected by detector 840 followed by a suitable low pass filter 842. At this point in the processing, a new label (or the same label) may be produced by processor 844 which presents the new label to MZM 870 simultaneously with the payload, where a converted payload/new label signal 880 is generated as a result of the drive signal modulation of the MZM 870.

As can be readily appreciated by those skilled in the art, the configuration depicted in this FIG. 8 does not require separation of payload and label, clock recovery or digitization. In addition, this configuration exhibits polarization independence and straightforward wavelength conversion through the effect of tuning the frequency of laser 860, connected to the MZM 870.

We note that the wavelength conversion method described above is simple and polarization independent. In comparison, previously reported packet wavelength conversions are usually performed through nonlinear processes such as XGM and four-wave-mixing (FWM) which are intrinsically polarization dependent. Since signal polarization is uncertain and time-varying in a network, sophisticated and expensive dynamical polarization tracking and maintenance are usually required when these polarization-dependent wavelength conversion schemes are employed. In addition, it is difficult for conventional wavelength converters to work in a broad wavelength band since these nonlinear processes generally have limited wavelength operating range.

Our inventive scheme—on the other hand—is based on a tunable laser at an intermediate note and as such may operate over a very broad wavelength range, e.g., the entire "C-band" of erbium-doped fiber amplifiers (EDFAs). Additionally, a new packet leaving an intermediate node may have the same wavelength as an input packet, which is in sharp contrast to conventional wavelength converters that cannot keep the packet wavelength thereby limiting network flexibility.

The foregoing embodiments are merely illustrative of the principles of the invention. Those skilled in the art will be able to devise numerous arrangements, which, although not explicitly shown or described herein, nevertheless embody those principles that are within the scope of the invention.

For example, the speed of the label encoding may be may be increased as required. For our experimental evaluations, the effective bandwidth of the bias port of the MZM used was on the order of ~300 MHz, and the gain modulation bandwidth of the RF amplifier is substantially ~500 MHz. As should be readily apparent, these bandwidths can be further increased through better RF packaging. In addition, using RZ-DPSK for payload may provide better performance than NRZ-DPSK, since RZ pulse carving can effectively remove the amplitude and timing jitter.

These modifications and substitutions, as well as others, will be apparent to those skilled in the art in view of well-known network and system design principles and further in view of the teachings herein and, as such, are contemplated for use according to the principles of the invention. Accordingly, the embodiments shown and described herein are only meant to be illustrative and not limiting in any manner. The scope of the invention is limited only by the claims appended hereto.

What is claimed is:

1. An optical payload/label transmitter apparatus comprising:
   a laser source;
   a Mach-Zehnder Modulator for generating a phase encoded payload signal in accordance with a payload drive voltage, by phase modulating an input light received from the laser source at an input optical port of the Mach-Zehnder Modulator; and
   the Mach-Zehnder Modulator for generating a label in accordance with a label encoding, by imposing an intensity modulation on the phase encoded payload signal;
   wherein the Mach-Zehnder Modulator generates the labeled phase encoded payload signal at an output optical port of the Mach-Zehnder Modulator, such that the phase encoded payload signal has phase-shift-keying (PSK) modulation format
   wherein the Mach-Zehnder Modulator is biased at null and the payload drive voltage swing is $2V_\pi$, and the label is generated by modulating the bias voltage of the Mach-Zehnder Modulator by applying the label encoding to the bias voltage.

2. The apparatus of claim 1 wherein the Mach-Zehnder Modulator includes an RF port and the phase encoded payload signal is generated by phase modulating the input light in accordance with the payload drive voltage applied at the RF port.

3. The apparatus of claim 2, wherein the label is generated by modulating the payload drive voltage swing applied at the RF port of the Mach-Zehnder Modulator.

4. The apparatus of claim 3 further comprising an RF amplifier, connected to the RF port of the Mach-Zehnder Modulator.

5. The apparatus of claim 4 wherein gain of the RF amplifier is modulated by the label encoding prior to its application to the RF port of the Mach-Zehnder Modulator.

6. The apparatus of claim 3 further comprising a broadband RF modulator, connected to the RF port of the Mach-Zehnder Modulator.

7. The apparatus of claim 6 wherein the payload drive voltage swing is modulated by the label encoding through the broadband RF modulator prior to its application to the RF port of the Mach-Zehnder Modulator.

8. The apparatus of claim 1 wherein the Mach-Zehnder Modulator is a single-drive, x-cut LiNbO3, Mach-Zehnder Modulator.

9. The apparatus of claim 1 wherein the Mach-Zehnder Modulator is a dual-drive, z-cut LiNbO3 Mach-Zehnder Modulator.

10. A method for generation of optical signals comprising the steps of:
generating a phase encoded payload signal component of the optical signals in accordance with a payload drive voltage, by phase modulating an input optical signal; and
generating a label component of the optical signals in accordance with a label encoding by biasing, at null and the payload drive voltage swing is $2V_\pi$, and modulating a bias voltage of the Mach-Zehnder Modulator, in accordance with the label encoding such that the label is generated, by imposing an intensity modulation on the phase encoded payload signal(s);
such that the labeled phase encoded payload signal(s) are generated through the effect of a single Mach-Zehnder Modulator, wherein the phase encoded payload signal has phase-shift-keying (PSK) modulation format.

11. The method of claim 10 further comprising the steps of:
phase modulating in accordance to the payload drive voltage applied at an RF port of the Mach-Zehnder Modulator such that the phase encoded payload signal is generated.

12. The method of claim 10 further comprising the steps of:
modulating the payload drive voltage swing in accordance with the label encoding signal, prior to applying the payload drive voltage at the RF port of the Mach-Zehnder Modulator such that the label is generated.

13. The method of claim 12 further comprising the steps of:
modulating the payload drive voltage swing through the effect of a broadband RF modulator prior to the payload drive voltage swing being applied to the RF port of the Mach-Zehnder Modulator.

14. The method of claim 10 wherein the Mach-Zehnder Modulator is a single-drive, x-cut LiNbO3, Mach-Zehnder Modulator.

15. The method of claim 10 wherein the Mach-Zehnder Modulator is a dual-drive, z-cut LiNbO3 Mach-Zehnder Modulator.

16. A method for processing optical signals comprising the steps of:
receiving an optical signal;
generating a phase encoded payload component of an output optical signal in accordance with a payload drive voltage, by phase modulating the received optical signal, wherein said output optical signal includes at least a portion of the received optical signal; and
generating a label component of the output optical signal in accordance with a label encoding, by imposing an intensity modulation on the phase encoded payload signal(s);
such that the labeled phase encoded payload signal(s) are generated through the effect of a single Mach-Zehnder Modulator, wherein the payload signal has phase-shift-keying (PSK) modulation format
wherein the Mach-Zehnder Modulator is biased at null and the payload drive voltage swing is $2V_\pi$ and the label is generated by modulating the bias voltage of the Mach-Zehnder Modulator by applying the label encoding to the bias voltage.

* * * * *